United States Patent [19]

Priese et al.

[11] 4,253,640
[45] Mar. 3, 1981

[54] ACTUATION SYSTEM FOR VALVE WITH COMPOUND CLOSURE MOVEMENT

[75] Inventors: Werner K. Priese, Barrington; Charles I. Koehlert, Dundee, both of Ill.

[73] Assignee: Hills-McCanna Company, Carpentersville, Ill.

[21] Appl. No.: 20,324

[22] Filed: Mar. 14, 1979

[51] Int. Cl.³ .................... F16K 31/04; F16K 31/122
[52] U.S. Cl. .................... 251/56; 91/189 R; 251/161
[58] Field of Search ............... 251/56, 160, 229, 161; 91/189 R

[56] References Cited

U.S. PATENT DOCUMENTS

| Re. 20,973 | 1/1939 | Goldberg et al. | 251/160 |
|---|---|---|---|
| 1,949,190 | 2/1934 | Smolensky | 251/161 |
| 1,949,191 | 2/1934 | Smolensky | 251/161 |
| 1,958,262 | 5/1934 | Boland | 251/160 |
| 2,153,885 | 4/1939 | Goldberg et al. | 251/56 |
| 2,326,686 | 8/1943 | Rutledge | 251/56 |
| 2,328,312 | 8/1943 | Vickers | 91/189 R |
| 2,366,398 | 1/1945 | Harrington | 91/189 R |
| 2,893,681 | 7/1959 | McNeal | 251/161 |
| 3,019,776 | 2/1962 | Clavell | 91/189 R |
| 3,207,468 | 9/1965 | Lauducci et al. | 251/58 |
| 3,330,289 | 7/1967 | Grace | 251/56 |
| 3,339,884 | 9/1967 | Smith et al. | 251/161 |
| 3,394,632 | 7/1968 | Priese | 251/58 |
| 3,785,613 | 1/1974 | Picard | 91/189 R |
| 3,793,893 | 2/1974 | Heinen | 251/229 |
| 3,948,284 | 4/1976 | Walworth | 251/161 Z |
| 3,967,534 | 7/1976 | Cryder et al. | 91/189 R |
| 3,985,151 | 10/1976 | Smith | 251/58 |
| 4,120,479 | 10/1978 | Thompson et al. | 251/58 |
| 4,132,071 | 1/1979 | Priese et al. | 60/328 |

FOREIGN PATENT DOCUMENTS 626354 10/1959 Italy .................... 91/189 R

Primary Examiner—Martin P. Schwadron
Assistant Examiner—G. L. Walton
Attorney, Agent, or Firm—Trexler, Wolters, Bushnell & Fosse, Ltd.

[57] ABSTRACT

A valve actuation system is provided for a valve of the type wherein at least two separate movements are utilized to achieve either opening or closing thereof. The actuation system includes a pair of hydraulic or pneumatic actuator units for automatically performing these two separate operations. An electrically energizable control valve is associated with each of these actuators for controlling the flow of a pressurized control medium therethrough to achieve actuation in the proper sequence for attaining the desired valve movement. A control circuit preferably comprises a plurality of switches responsive to the positions of these two valve actuators as well as the position, (viz., "valve open" or "valve close") of an operator accessible main control lever or switch. These switches deliver electrical power to energize the fluid flow control valves so as to automatically perform the correct sequence of actuator operations to open or close the valve, as desired.

12 Claims, 8 Drawing Figures

ACTUATION SYSTEM FOR VALVE WITH COMPOUND CLOSURE MOVEMENT

BACKGROUND OF THE INVENTION

The present invention is directed generally to automatic actuation of fluid flow control valves and more particularly to a new and improved automatic actuation system for a valve having compound movement during the opening and closing operation.

The invention will be particularly described herein with reference to a ball valve having a compound closure movement, of the type disclosed in a copending application Ser. No. 886,649, filed Mar. 15, 1978. Briefly, this ball valve comprises a body which defines a valve chamber in which a rotary fluid control ball member is contained. The body also defines a pair of passages which communicate with the valve chamber on opposing sides thereof, until the ball member having a through bore for connecting the passages when the ball is in the "valve open" position. The valve chamber is designed such that converging annular wall or seating surfaces are provided where the passages open into said chamber. Generally annular sealing rings or seats for the ball are held in surrounding relation to these converging surfaces and the ball to form a seal. A control shaft is joined with the ball and a first lever is provided for moving the ball with respect to the seal rings and seating surfaces to achieve a wedging action or alternately to relieve the wedging action to allow free rotation of the ball to its open or closed position as desired. A second control lever mounted on the valve shaft achieves this latter rotation of the ball type flow control member. Consequently, the preferred sequence of operation of the valve is generally as follows: raise-rotate-lower, for each opening or closing operation of the valve.

It is important to assure that such a compound movement valve is operated in the proper sequence, as described above, to prevent possible damage to the valve or to the system of which the valve is a part. Typically, such valves are used in systems where relatively high pressures and/or temperatures are encountered, such that failure of such a valve may have highly undesirable or even dangerous conseqences.

OBJECTS AND SUMMARY OF THE INVENTION

Accordingly, it is a general object of the present invention to provide a new and improved actuation system for a valve having a compound closure movement.

A more specific object is to provide such an actuation system which automatically provides the proper sequence of operation for opening and closing the valve.

A further object is to provide such a valve actuation system which provides the proper sequence of operation in response to actuation of a single control element to either an "open" or "close" position by the operator.

In accordance with the foregoing objects, an actuation system for a valve having first and second independent members actuatable in a predetermined sequence for achieving a compound closure movement comprises; a fluid-operated valve actuator means for driving said first and second independent members to achieve the opening and closing of said valve in accordance with said compound closure movement, electrically energizable fluid flow control means for controlling the delivery of fluid to operate said valve actuator means, control means actuatable by an operator to an open position and to a close position, and control circuit means responsive to said operator actuatable control means for energizing said fluid flow control means in a predetermined fashion so as to automatically achieve said predetermined sequence of actuation for opening and closing of the valve in accordance with the position of the operator actuatable control means.

BRIEF DESCRIPTION OF THE DRAWINGS

The foregoing, as well as other objects, features and advantages of the present invention will be more readily appreciated upon consideration of the following detailed description of the illustrated embodiment, together with the accompanying drawings wherein.

DETAILED DESCRIPTION OF THE ILLUSTRATED EMBODIMENT

Figure 1:
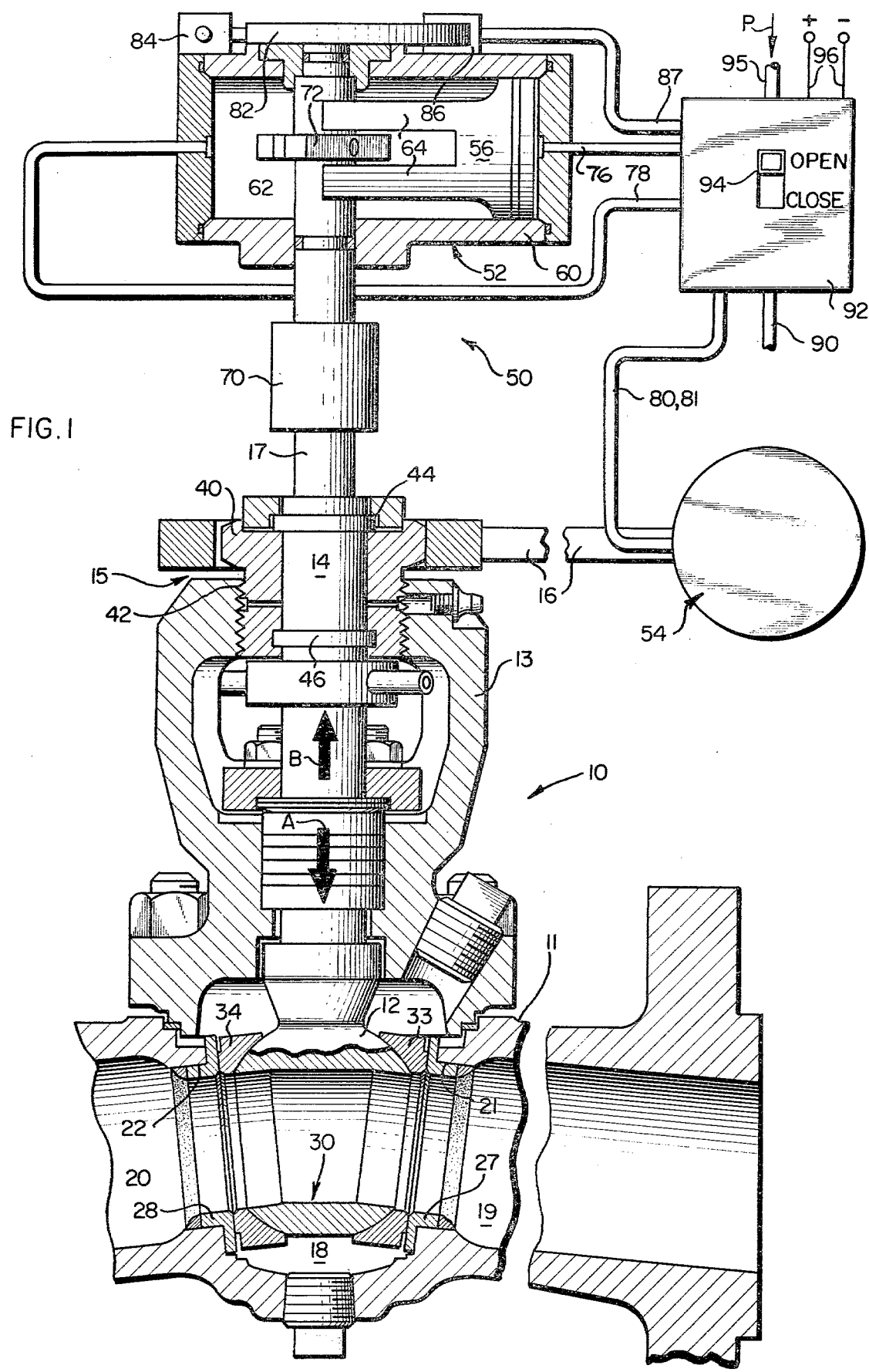
FIG. 1 is a side elevational view, partially in section and partially schematic in form, illustrating a ball valve with compound closure movement in conjunction with an actuation system therefor in accordance with the invention.
Figure 2:
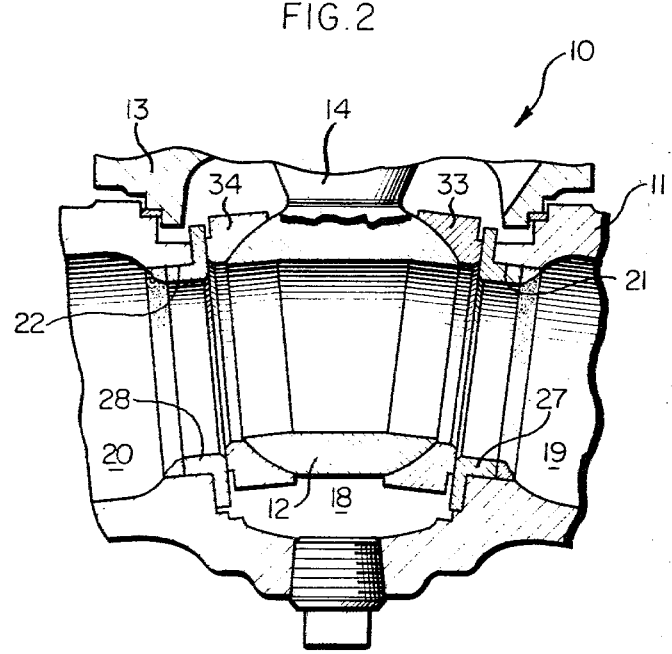
FIG. 2 is a partial sectional view of a portion of FIG. 1, illustrating a first stage or operation in the compound movement of the ball valve.

Reference is initially invited to FIGS. 1 and 2 wherein the valve actuation system of the invention is shown in conjunction with an exemplary ball-type valve, designated generally 10, designed to achieve a compound movement during the opening and closing thereof.

In order that the instant invention may be more fully appreciated, it will be instructive to first review briefly the structure and operation of the ball valve 10, and particularly the compound movement feature thereof.

As viewed in FIGS. 1 and 2, the ball valve unit 10 generally includes a main body 11; a rotary ball or valve member 12; a cover or bonnet 13; a shaft or stem 14; a rotary valve or ball member moving means or assembly, designated generally 15, and including a pair of operating members 16 and 17. Conventionally, the main body 11 defines a valve chamber 18 and a pair of passages 19 and 20 communicating with opposite sides thereof. These passages 19 and 20 intersect the valve chamber 18 at openings 21 and 22. A pair of seat support rings 27 and 28 are provided, one about each of the openings 21 and 22, which rings support a pair of annular seals or seats 33 and 34.

Departing from conventional practice, the support rings 27 and 28 which define the portion of the chamber 18 about the openings to passages 19 and 20, are disposed so as to generally converge along a line equidistant between the facing surfaces thereof in a direction away from the bonnet and stem 14, that is generally in the direction of arrow "A", towards the bottom of FIG. 1. Cooperatively, the base 30 in the ball member 12 is canted and disposed below the axial center line, such that the intersection of the bore 30 with the outer surface or face of the valve member 12 defines complimentary, converging edge surfaces. The seats 33 and 34 include inwardly facing spherical surfaces, which complement the exterior surface of the ball 12, and outwardly facing surfaces which are annular and engage the seat support ring surfaces. As these support surfaces converge, the seats 33 and 34 are also disposed in a canted converging orientation, for a purpose which will become clear. Accordingly a force exerted on the ball member 12 in the direction "A" will cause the ball 12 and seats 33 and 34 to move downwardly, relative the seed support rings 27 and 28, which due to the tapered position of said rings, wedges the sealing rings 33 and 34 into firm sealing contact with the ball 12. Thus, as the ball 12 and sealing rings 33 and 34 are moved in the direction "A" towards the bottom of FIG. 1, the seal between the ball and sealing rings and also between the sealing rings and their supports 27 and 28 is increased. Conversely, as the ball 12 is moved in the opposite direction, indicated generally by arrow B, or toward the top of FIG. 1, the sealing action and sealing force are relieved.

In view of the foregoing sealing action between these components, it is difficult, if not impossible, to operate the rotary ball member 12 between its open position and its closed position when the valve is fully wedged or seated in the direction A. However, such rotation of the ball is relatively easy when it is raised or moved somewhat from this sealed or wedged condition, as illustrated in FIG. 2. To this end, the lever member 16 is disposed for rotating an externally threaded gland nut 40 in engagement with a thread 42 at the upper portion of the housing 13. The gland nut 40 is in turn coupled to the stem 14 by way of two split rings 44 and 46. Consequently, the rotation of the gland nut 40 by operation of the member 16 causes corresponding movement of the shaft 14 in either the A or B direction, correspondingly either raising or lowering the ball 12. Rotation of the ball 12 for opening or closing the valve is accomplished conventionally, when the ball 12 is in its raised position as illustrated in FIG. 2, by rotation of the member 17, which is directly coupled to the shaft 14.

Further details of the structure and operation of the exemplary compound closure movement valve 10 are not necessary to a full understanding and appreciation of the present invention. However, a full description of such a ball valve is given in said copending application, Ser. No. 886,649, filed Mar. 15, 1978, which description is incorporated herein by reference.

Having described the basic structure and operation, and especially the compound closure movement, of the ball valve 10, it will be appreciated that it is important to observe the proper sequence of operation thereof via manipulation of the members 16 and 17, to achieve proper opening or closing action. While this may of course be done manually, it is difficult to insure that such a valve will be correctly manually operated under all conditions and circumstances, even by relatively unskilled peronnel, and further in many instances automatic operation is preferred over manual operation.

Advantageously, then, the present invention contemplates provision of a novel actuation system for automatically achieving the correct sequence of operation of a compound closure movement valve such as the valve 10. Briefly, by way of review, this sequence of operation for both opening and closing of the valve is as follows: raise, rotate open, lower; or alternatively, raise, rotate close, lower.

Referring again to FIGS. 1 and 2, the actuation system of the invention, designated generally 50, includes a pair of actuators 52 and 54, associated respectively with the members 17 and 16. These valve actuators designated generally 52 and 54, are arranged respectively for driving the members 17 and 16, thereby facilitating the two portions of the compound closure movement of the valve 10 in the fashion described above. Broadly speaking, the actuators 52 and 54 may take any of a variety of forms known in the art. For purposes of describing a specific embodiment, the illustrated actuators 52 and 54 comprise fluid driven piston-and-cylinder arrangements. Each actuator has suitable connections (to be described more fully hereinbelow) to sources of pneumatic or hydraulic fluids under pressure to effect reciprocation thereof as desired for operating the associated members 17 and 16 as required to open or close the valve 10.

In the illustrated embodiment, the actuator 52 comprises a valve actuator similar to the type shown and described in said earlier U.S. Pat. No. 3,394,632, dated July 30, 1968, and therefore need not be described herein in detail. Briefly, this actuator 52 may be characterized as a "double-acting" type actuator having a piston 56 mounted for reciprocation within a cylinder 60. Either pneumatic or hydraulic pressure may be used in such a system, the illustrated embodiment using the former. Generally speaking, the piston 56 reciprocates inwardly and outwardly with respect to a drive shaft 62 of the actuator 50. This drive shaft 62 is coupled to rotate shaft 14 via a suitable coupling 70 at the member 17. Paired, longitudinal side wall portions 64 of the piston 56 extends generally in the direction of drive 62. This pair of longitudinal side wall sections carries a pin, (not shown) rotatably mounted therewith, which in turn drives a yoke plate 72 non-rotatably mounted to the shaft 62. Accordingly, it will be seen that inward and outward reciprocation of the piston 56 causes corresponding rotational movement of the shaft 62. Consequently, shaft 14 is rotated by actuator 54 for the opening and closing rotary movement of the compound movement valve 10.

The drive member 16 is similarly equipped with a relatively simple piston-and-cylinder actuator 54. This actuator 54 is fitted with a suitable coupling (see FIGS. 3-6) to the lever or drive member 16 to effect the required movement thereof. In the figures of drawings, this latter actuator 54 is illustrated somewhat schematically as a piston reciprocating within a cylinder, it being understood that the structure thereof may be varied without departing from the invention. It should also be noted, in this regard, that variations and modifications may be made in the structure and mode of operation of either of these actuators 52, 54 without departing from the spirit and scope of the present invention. For example, one alternative form of actuator known generally as a "fail-safe" type of actuator utilizes springs mounted within its cylinder to cause automatic return of the piston(s) and therefore of its shaft to a fail-safe or rest position. Thus, in the absence of sufficient opposing force of pressurized fluid tending to drive the actuator to an opposite state or direction, it will assume this fail-safe or rest position. Such an arrangement is shown, for example, in said copending application Ser. No. 840,602, filed Oct. 11, 1977, now U.S. Pat. No. 4,132,071.

Referring again to FIG. 1, other elements of the control system in accordance with the present invention are also illustrated. Suitable lines for carrying pressurized air for pneumatic operation are provided for the actuators 52 and 54. Hydraulic actuators and a suitable source of hydraulic fluid may be utilized without departing from the invention. In this regard, actuator 52 is fed by fluid line 76, which feeds the outboard side of the piston 56, while a similar fluid line 78 feeds the inboard side of the piston 56. A further similar pair of fluid carrying lines 80, 81 (best seen in FIG. 3) are arranged to feed the actuator 54.

Suitable electrical control circuits are also associated with the actuators 52 and 54. In this regard, the actuator 52 is provided with a cam member 82 which is attached for rotation in unison with the shaft 62. This cam 82 is disposed for actuating one of two electrical control switches 84 and 86 mounted adjacent the actuator 52 and generally to either side of the shaft 62 thereof. A similar control switch 88 (best seen in FIG. 3) is mounted adjacent the actuator 54 for cooperation therewith as will be more fully described hereinbelow. Suitable wires or cables 88 and 90 join the respective switches 84, 86 and 88 with a master control console 92, which also receives the fluid lines 76, 78 and 80, 81. This control console 92 also receives a main or master fluid input line 95, for receiving a suitable supply of pressurized fluid, as indicated by the arrow P. Control console 92 is also joined with a suitable source of electrical power 96. A master switch or similar control member 94 is movable to either an open (OPEN) or a close (CLOSE) position by the operator, and advantageously comprises the only operator actuable control of the invention. The remaining components operate automatically in response to operator actuation of this master control 94.

Reference is next invited to FIGS. 3 through 6, wherein a preferred form of the structure of the invention is schematically illustrated, revealing the sequence of operation thereof in achieving the compound closure movement for both opening and closing the valve 10 of FIGS. 1 and 2.

Figure 3:
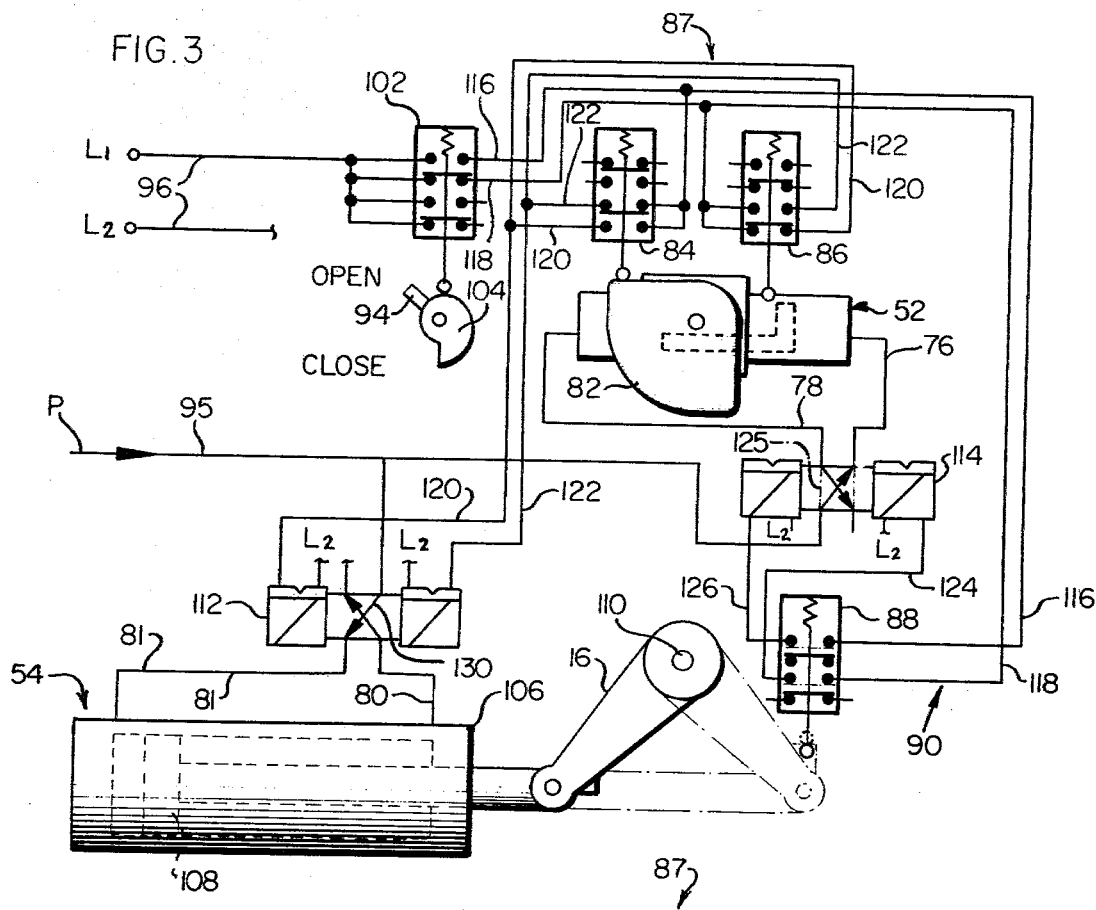
FIGS. 3 through 6 are diagrams in schematic form illustrating the structure and operation of the valve actuation system of the invention.

Referring initially to FIG. 3, it will be seen that the switches 84, 86 and 88 each comprises a multi-pole, double-throw switch which is spring or otherwise biased to return the switch to its normal position. Such switches are of a conventional nature and need not be described in further detail. A further, similar switch 102 is associated with the master control member 94, which in the illustrated embodiment comprises a lever arranged to rotate a suitable cam 104. This cam 104 in turn drives the switch 102 between its two "throw" or possible positions.

The actuator 54 is schematically illustrated as a cylinder 106 and a piston 108 mounted for reciprocal motion therein. The fluid delivery lines 80 and 81 thus enter the cylinder 106 so as to feed opposite sides of the piston 108. Additionally, the actuating member 16 associated with valve 10 is illustrated as a lever, movable through substantially 90° of arc about a pivot 110, for selectively actuating the associated switch 88. It will also be noted that the switches 84 and 86 are so mounted that the cam 82 may throw one, the other or neither as it moves in unison with the shaft 62 during the rotary motion of the valve 10.

Completing the structure of the illustrated embodiment, a pair of four-way, electrically energizable valves 112 and 114 are provided for controlling the delivery of fluid respectively to the fluid carrying lines 80 and 81 to actuator 54 and to the similar lines 76 and 78 to actuator 52. These fourway, electrically energizable valves 112 and 114 are conventional valves well known in the art and need not be described in detail. Suffice it to say that these valves 112 and 114 each have an input port, an exhaust port, and two output ports and respond to different electrical signals received at their control terminals for delivering fluid in selected directions between their respective output ports.

In the illustrated embodiment, the main fluid supply line 95 feeds the input port of each of the control valves 112, 114, while the exhaust ports are connected to a suitable fluid drain or return line (not shown). The output ports of the control valve 112 feed the respective lines 80 and 81 to the actuator 54, while the output ports of the valve 114 feed the respective lines 76 and 78 to the actuator 52. Referring now to the electrical interconnections of the system of FIGS. 3 through 6, it will be seen that the external power source input lines 96 comprise lines generally designated L1 and L2, which may suitably be arranged as the "hot" and "ground" lines of a conventional power source, as desired. The L2 line has been severed to facilitate clarity in the illustration, but will be seen to feed one side of each electrical control terminal pair of the respective valves 112 and 114, as illustrated by repeated use of the reference character 12 thereat. The L1 electrical power line feeds all terminals at one side of the switch 102.

The opposite side of the switch 102 has a pair of terminals feeding a pair of lines 116, 118, it being noted that the switch 102 is arranged to alternatively feed one or the other of these lines 116, 118 depending on the position of the master control lever 94. The line 116 feeds a pair of terminals at one side of the switch 84, which has terminals at the opposite side feeding a pair of lines 120, 122, which in turn feed the remaining electrical control terminals of the valve 112. The line 118 feeds input terminals to the switch 86, whose outputs feed these same two lines 120, 122. The lines 116 and 118 also feed input terminals of the switch 88, whose output terminals feed a pair of lines 124, 126 which are the control lines to the electrical control terminals of the valve 114.

In operation, then, the switch 102 is selectively movable for applying electrical power to either the switch 84 or the switch 86, via the respective lines 116 and 118. Similarly, the switches 84 and 86 are each selectively movable between two positions for applying the received electrical power to either the line 120 or the line 122. The switch 88 is similarly movable between two positions for selectively opening or closing the circuits between the line 116 and the line 126 and between the line 118 and the line 124, respectively.

Now that the structure of the invention has been described, the sequence of operation may be readily seen, referring, in order, to FIGS. 3 through 6. Assuming that the valve is initially in the closed position, and referring to FIG. 3, actuation of the master control lever 94 to the open position will automatically initiate the proper sequence of events to effect the compound movement of the valve to the open position. This actuation of the control lever 94 to the open position allows switch 102 to return to its spring-biased rest position, thereby delivering electrical power to the line 118 feeding the switch 86. The switch 86 is also in its rest position, due to the position of the cam 82 remote from the actuating member of switch 86. Accordingly, electrical power is fed from the line 118 through the switch 86 to the line 120. This line 120 actuates the valve 112 to pass fluid in the direction indicated by arrow 130, thereby driving the piston 108 of actuator 54 generally outwardly or to the right as viewed in FIG. 3. This movement of the piston 108 causes corresponding movement of the lever or control member 16 to the position illustrated in dotted line, which actuates the switch 88 to the position shown in dotted line in FIG. 3 and in full line in FIG. 4. Thus, the circuit is completed between the energized line 118 and control line 124 to valve 114. Valve 114 responds by delivering fluid from the line 95 to the fluid line 78 feeding the actuator 52 as illustrated by arrow 125, FIG. 4. Thus, the lever 16, the valve 114 and the actuator 52, including the cam 82 thereof are driven to the position illustrated in solid line in FIG. 4. It will be remembered that this actuation of the lever 16 causes the raising of the valve ball 12 (see FIG. 2) to achieve the first portion or operation in the compound closure movement thereof. Similarly, the subsequent operation of the actuator 52 causes rotation of the valve ball 12 to achieve opening thereof, in the illustrated embodiment, and thereby concurrently achieving 90° of relative rotation of the cam member 82.

Figure 4:
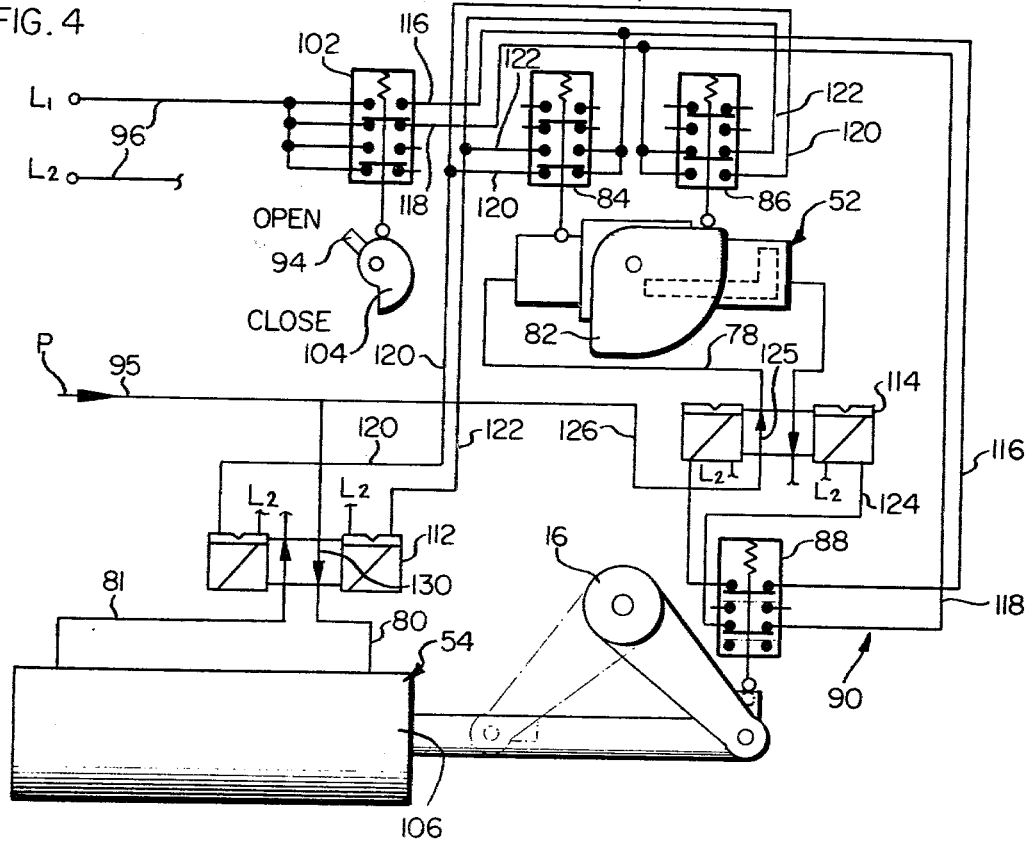

Referring to FIG. 4, the cam member 82 thus disengages from the switch 84 and engages the actuator of switch 86, thereby causing each switch 84, 86 to assume the position opposite that illustrated in FIG. 3. Accordingly, as the electrical power remains supplied only to line 118, the switch 86 now feeds power to the line 122, removing electrical power from the line 120. The line 122 energizes the opposite side of the valve 112 thereby causing pressurized fluid to be delivered thereby to the line 80 feeding actuator 54. Actuator 54 responds by withdrawing the piston 108, which rotates the lever 16 back to the position illustrated in dotted line in FIG. 4. Fluid is concurrently exhausted from the line 81, allowing this return of piston 108 generally to the left as viewed in FIG. 4. This movement of lever 16 to the position shown in dotted line also allows switch 88 to return to its spring-biased or rest position shown in dotted line in FIG. 4, thereby removing electrical power from valve 114. Consequently, the valve 114 continues to deliver fluid in the direction shown by arrows 125, maintaining the position of actuator 52.

Figure 5:
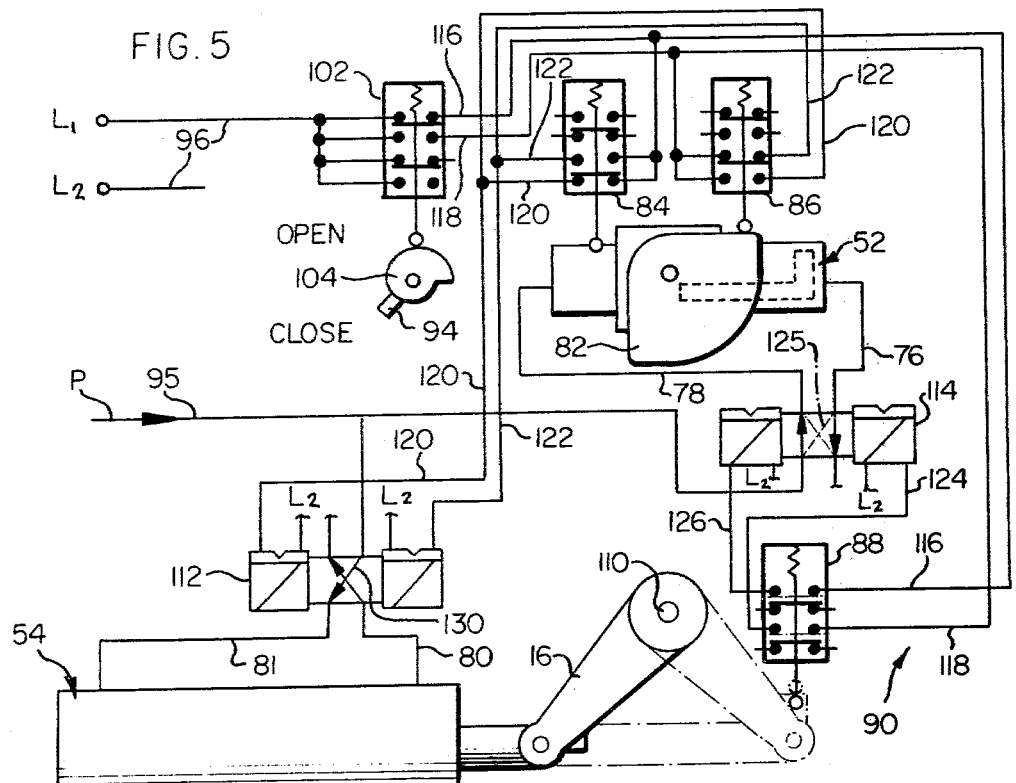
Figure 6:
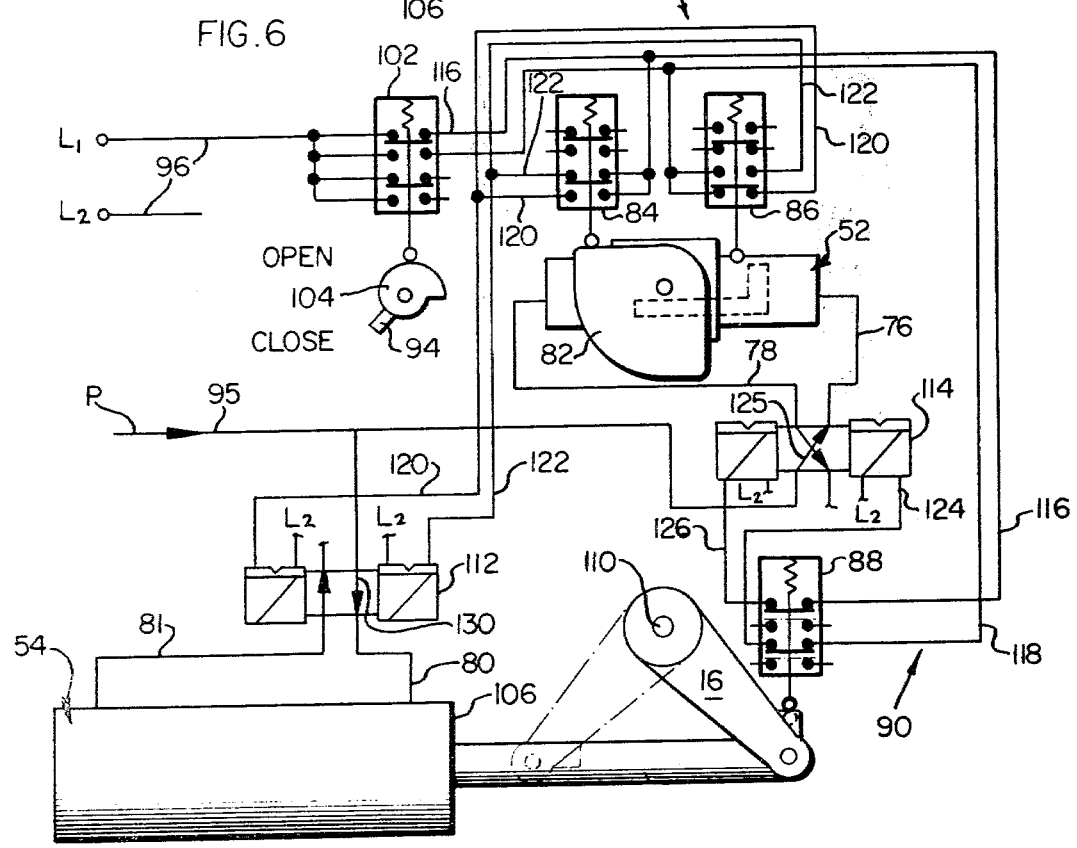

Referring now to FIGS. 5 and 6, the closing of the valve 10 (FIG. 1) by the novel control system of the invention is illustrated. Initially, in FIG. 5 the control lever 94 is moved by the operator to the closed position whereby the switch 102 is thrown to apply power to the line 116. Consequently, electrical power is applied thereby to the switch 84, which is in its spring-biased or rest position for transferring electrical power to line 120. This energizes control valve 112 to deliver fluid as illustrated by the arrow 130 in FIG. 5. Specifically, pressurized fluid is again delivered from the input line 95 to the line 81 and is exhausted from line 80, to effect movement of the piston 108 back outwardly as indicated in dashed line. The lever 16 and switch 88 therefore move to the positions illustrated in dashed line in response to this movement of lever 16. Since electrical power is now present at line 116, switch 88 passes suitable energizing power on line 126 to the control valve 114, which results in pressurized fluid being routed, as indicated in dotted line 125, to feed the line 76 and to exhaust the line 78. Thus, actuator 52 is returned to the opposite position, as viewed in FIG. 6.

It will be remembered that the just-described movement of control lever 16 again causes raising of the valve stem and ball (see FIG. 2) completing the first portion or operation of the compound closure movement thereof. The subsequent movement of actuator 52 achieves suitable rotation of valve 10 (FIG. 1) to its closed position. The resulting positions of the lever 16, the control valve 114, the switch 88, and the cam 82 on actuator 52 and of the switch 84 are all shown in solid line in FIG. 6.

Referring now more particularly to FIG. 6, the valve 10 (FIG. 1) has now been rotated to its closed position, and all that remains is to return the valve to its wedged or sealed position, as illustrated in FIG. 1, to complete the compound closure movement thereof. When the cam 82 again depresses or throws the switch 84, the electrical power present on the line 116 is removed from the line 120 and fed instead to the line 122, thus energizing the opposite side of control valve 112. Accordingly, the fluid flow therethrough will be as illustrated by the arrow 130, delivering pressurized fluid to line 80 and exhausting fluid from line 81. Accordingly, the actuator 54 will return the lever 16 to the position shown in dashed line in FIG. 6. This movement of lever 16 will cause switch 88 to again return to its position shown in dashed line in FIG. 6, and effect the appropriate downward motion for causing wedging or sealing of the valve 10 as described above with reference to FIGS. 1 and 2.

It will be noted that the positions of the elements illustrated in FIG. 6, including the positions of lever 16 and the switch 88 illustrated in dashed line therein, are essentially the same as the starting positions thereof as shown in FIG. 3. However, control switch or lever 94 and of its associated switch 102 are at the close position. Thus, the complete cycle of opening and closing of the valve is conveniently accomplished, in response to the simple expedient of operator actuation of the control member 94 to the open position or close position, to open or close the valve 10 (FIG. 1) as desired.

Figure 7:
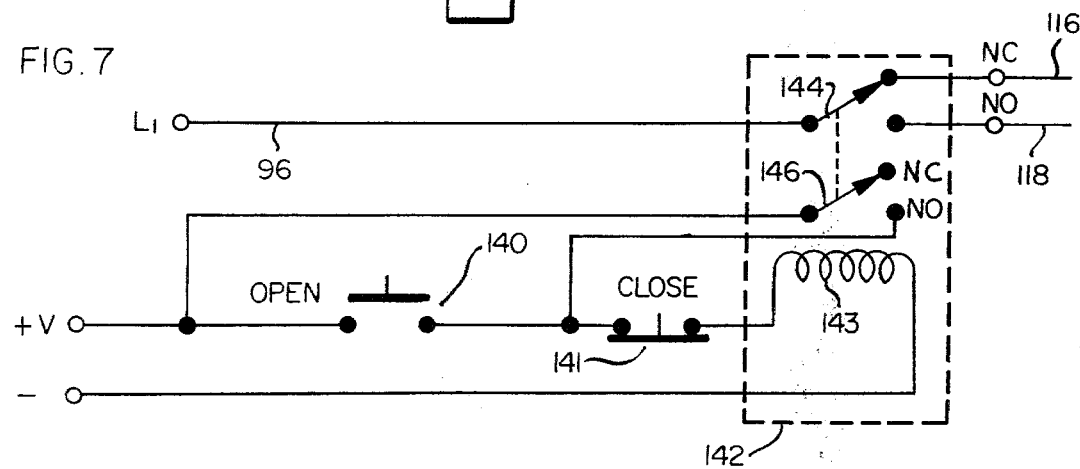
FIG. 7 illustrates an alternative embodiment of a portion of the system of FIGS. 3 through 6.

Referring briefly to FIG. 7, an alternate embodiment of an operator accessible master control is illustrated. Replacing the arrangement comprising the switch or lever 94, cam 104 and switch 102 in FIGS. 3 through 6, is a dual pushbutton switch 140, 141 and a relay 142. A suitable source of potential ($+V,-$) for energizing the coil 143 of relay 142 is applied across one side of the switch 140 and one side of coil 143, respectively. The pushbuttons 140, 141 are labelled OPEN and CLOSE and are series connected so as to control the application of power to the coil 143. The relay 142 has a pair of movable contactors 144, 146 which receive one side of the main power line 96 and the $+V$ potential, respectively. The movable contactor 144 alternatively delivers electrical power from the line 96 to either the line 116 or the line 118 to achieve the same mode of operation as described above with reference to FIGS. 3 through 6. The movable contactor 146 moves in unison with the contactor 144, and is wired to effectively short-circuit the OPEN switch 140 when moved to its NO terminal. In the embodiment illustrated in FIG. 7, the line 118 is joined with the normally open (NO) terminal of movable contactor 144 and the line 116 is joined with the normally closed (NC) terminal thereof. Accordingly, when the OPEN pushbutton is actuated, the relay 142 is energized to apply electrical power to the line 118 and when the CLOSE pushbutton is actuated, the relay is de-energized, thereby applying electrical power to the line 116.

Figure 8:
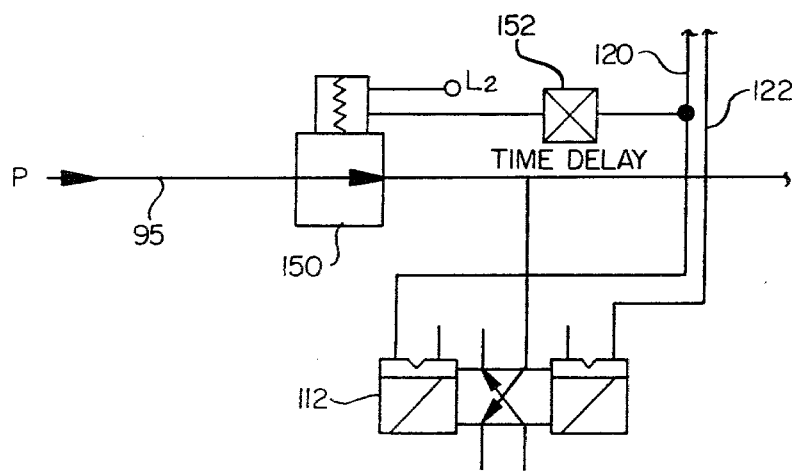
FIG. 8 illustrates an alternate embodiment of another portion of the system of FIGS. 3 through 6.

Referring briefly to FIG. 8, an optional feature comprises the addition of an electrically controlled valve 150 as a master control valve in the pressurized fluid input line 95. Briefly, this electrically operated valve 150 is of a simple two-position variety for selectively delivering fluid therethrough or cutting off the flow of fluid. This valve 150 is interposed in the line 95 prior to the point where it feeds the respective control valves 112 and 114 (control valve 114 not shown in FIG. 8). The electrical control inputs of the valve 150 are fed from the L2 side of the power input lines 96, and with the line 120 as indicated. A time delay unit 152 is interposed in this latter line (i.e. between line 120 and the control input of valve 152). This time delay 152 is set for instantaneous make and delayed break of the circuit, to allow sufficient time for the operation of the system as described above with reference to FIGS. 3 through 6, for opening and closing the valve 10. Accordingly, this master valve 150 will close at the end of the respective opening and closing cycles of the valve 10 (FIG. 1) as described above, thereby avoiding constant pressurization of the actuators 52 and 54 for any extended period of time when the valve 10 (FIG. 1) is in either the fully open or fully closed position.

While the present invention has been described above with reference to a preferred embodiment the invention is not limited thereto. On the contrary, various changes, modifications and alternatives may occur to those skilled in the art, and are to be understood as forming a part of the invention, insofar as such changes, modifications and alternatives fall within the spirit and scope of the appended claims.

The invention is claimed as follows:

1. An actuator system for a valve of the type wherein the valve member is subjected to compound movement including raising the valve member from a seal position, rotating the valve member to an open and close position and lowering the valve member back to said seal position during the opening and closing operation, said system comprising: first actuator means selectively energizable to a first state for actuating the valve member to achieve said raising portion of said compound movement during both opening and closing of the valve and energizable to a second state for actuating the valve member to achieve said lowering portion of said compound movement during both opening and closing of the valve, second valve actuator means selectively energizable to a first state for actuating the valve member to achieve said rotating portion of said compound movement during opening of the valve and energizable to a second state for actuating the valve member to achieve said rotating portion of said compound movement during closing of the valve, master control means selectively actuatable by an operator to a valve open state and to a valve close state, first electrical circuit means responsive to the respective valve open and valve close states of said master control means for producing corresponding electrical signals, second electrical circuit means responsive to the states of said first valve actuator means for producing corresponding electrical signals, third electrical circuit means responsive to the state of said second valve actuator means for producing corresponding electrical signals, and electrically operated actuator control means responsive to selected ones of the electrical signals of said first, second and third electrical circuit means for controlling the energization of said first valve actuator and of said second valve actuator, thereby automatically achieving a predetermined sequence of operation defining the compound movement of said valve for both opening and closing thereof in response to operator actuation of said master control means to its respective valve open and valve close states.

2. A valve actuation system according to claim 1 wherein said first valve actuator means comprises cylinder means and piston means movable within said cylinder means to a first position and to a second position corresponding respectively to said first state and said second state.

3. A valve actuator system according to claim 2 wherein said first actuator means is fluid operated and wherein said electrically operated actuator control means comprises electrically operated valve means responsive to predetermined ones of the signals from said first and third electrical circuit means for delivering fluid in a predetermined fashion to said first actuator means to achieve the respective first and second states thereof.

4. A valve actuation system according to claim 1 wherein said second valve actuator means comprises cylinder means and piston means movable within said cylinder means to a first position and to a second position corresponding respectively to said first state and said second state.

5. A valve actuation system according to claim 4 or claim 3 wherein said second actuator means is fluid operated and wherein said electrically operated actuator control means comprises electrically operated valve means responsive to predetermined ones of the signals from said first and second electrical circuit means for delivering fluid in a predetermined fashion to said second actuator means to achieve the respective first and second states thereof.

6. A valve actuation system according to claim 1 wherein said first electrical circuit means comprises switch means responsive to operator actuation of said master control means for producing a valve open signal when the master control means is in the valve open state and a valve close signal when the master control means is in the valve close state.

7. A valve actuation system according to claim 6 wherein said second electrical circuit means comprises second switch means responsive to said first valve actuator means for producing a first signal in response to the first state thereof and for producing a second signal in response to the second state thereof.

8. A valve actuation system according to claim 1 or claim 7 wherein said third electrical circuit means comprises valve open switch means responsive to said second actuator means for producing a first state signal when said second actuator means is in said first state and for producing a not first state signal when said second valve actuator means is not in said first state, and close control switch means responsive to said second valve actuator means for producing a second state signal when said second valve actuator means is in said second state and for producing a not second state signal when said second valve actuator means is not in said second state.

9. An actuation system for a valve having a compound movement requiring actuation in a predetermined sequence of at least two independent valve control members to achieve either opening or closing of the valve, said actuation system comprising: first and second actuator means for respectively actuating said two independent valve control members, electrically energizable actuator control means for controlling the operation of said first and second actuator means, master control means actuatable by an operator to an open position and to a close position, and electrical control circuit means responsive to said operator actuatable master control means for energizing said electrically energizable actuator control means in a predetermined fashion so as to automatically achieve said predetermined sequence of actuation of said valve control members for opening and closing of the valve in accordance with the position of the operator actuatable control means, wherein said first actuator means raises and lowers the valve member from and to a seal position, respectively, and said second actuator means rotates the valve member to an open and close position.

10. A actuation system according to claim 9 wherein said actuator means includes a first actuator associated with a first member of said independent members and a second actuator associated with a second member of said independent members.

11. An actuation system according to claim 10 wherein said first and second actuators are fluid operated and said electrically energizable actuator control means comprises a first control valve means responsive to said electrical control circuit means for causing said first actuator to assume a first state and a second state in a predetermined fashion for driving the associated member to corresponding first and second positions, and a second electrical control valve means responsive to said control circuit means for causing said second actuator to assume a first state and a second state in a predetermined fashion for driving the associated member to corresponding first and second positions.

12. An actuation system according to claim 11 wherein said control circuit means includes means responsive to the respective states of said first actuator and said second actuator and to operator actuation of said master control means for producing corresponding signal means for control of said first and second control valve means.

* * * * *